United States Patent
Katcher et al.

(10) Patent No.: US 10,823,227 B2
(45) Date of Patent: Nov. 3, 2020

(54) SYSTEM TO PROVIDE RELIABLE FLOW OF LOW TEMPERATURE COOLING AIR TO AN ANTIFRICTION BEARING BURIED INSIDE A ROTATING MACHINE

(71) Applicant: SAFRAN ELECTRICAL & POWER, Blagnac (FR)

(72) Inventors: Thomas E. Katcher, Euclid, OH (US); William Gademer, Broadview Heights, OH (US); John Gregory Snelick, Canal Fulton, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 16/355,906

(22) Filed: Mar. 18, 2019

(65) Prior Publication Data
US 2019/0293123 A1 Sep. 26, 2019

Related U.S. Application Data
(60) Provisional application No. 62/645,340, filed on Mar. 20, 2018.

(51) Int. Cl.
*F16C 37/00* (2006.01)
*F04D 29/04* (2006.01)
(Continued)

(52) U.S. Cl.
CPC .......... *F16C 37/007* (2013.01); *F04D 29/049* (2013.01); *F04D 29/059* (2013.01); *F04D 29/584* (2013.01); *F04D 29/588* (2013.01)

(58) Field of Classification Search
CPC ...... F16C 37/00; F16C 37/007; F04D 29/049; F04D 29/059; F04D 29/584; F04D 29/588
See application file for complete search history.

(56) References Cited

U.S. PATENT DOCUMENTS
| | | | |
|---|---|---|---|
| 2,549,171 A | 4/1951 | Clayton | |
| 5,102,305 A * | 4/1992 | Bescoby | F01D 5/02 416/241 B |

(Continued)

FOREIGN PATENT DOCUMENTS
| | | | |
|---|---|---|---|
| DE | 2306588 | * | 8/1974 |
| JP | H10-14161 | | 1/1998 |
| WO | WO 2002-12603 | * | 2/2002 |

OTHER PUBLICATIONS
Machine translation of WO 2002-12603 (Year: 2002).*
(Continued)

*Primary Examiner* — Alan B Waits
(74) *Attorney, Agent, or Firm* — Rankin, Hill & Clark LLP

(57) ABSTRACT

A rotating machine includes a housing and a first bearing received in the housing. The rotating machine also includes a shaft supported by the first bearing. The shaft defines a central axis that extends in a longitudinal direction. The rotating machine also includes at least one duct radially interior to the outer diameter of the shaft. The duct includes an inlet port and a radial outlet port that are in fluid communication with one another. The inlet port is configured to receive air and the radial outlet port is configured to discharge the air. The rotating machine also includes an air mover longitudinally disposed between the first bearing and the inlet port of the duct. The air mover creates an area of air pressure at the radial outlet port that is less than an air pressure at the inlet port.

20 Claims, 5 Drawing Sheets

(51) Int. Cl.
*F04D 29/58* (2006.01)
*F04D 29/049* (2006.01)
*F04D 29/059* (2006.01)

(56) References Cited

U.S. PATENT DOCUMENTS

| | | | |
|---|---|---|---|
| 2004/0202536 A1* | 10/2004 | Macfadyen | F01D 25/125 |
| | | | 415/111 |
| 2007/0273228 A1* | 11/2007 | Tanaka | F16C 33/6677 |
| | | | 310/90 |
| 2009/0180727 A1* | 7/2009 | Shu | F16O 37/007 |
| | | | 384/523 |
| 2012/0070316 A1 | 3/2012 | Glitz et al. | |

OTHER PUBLICATIONS

Machine translation of DE 2306588 (Year: 1974).*
International Search Report and Written Opinion dated Jun. 12, 2019, 32 pages.

* cited by examiner

SYSTEM TO PROVIDE RELIABLE FLOW OF LOW TEMPERATURE COOLING AIR TO AN ANTIFRICTION BEARING BURIED INSIDE A ROTATING MACHINE

BACKGROUND

Bearings are used to rotationally support shafts in a variety of rotating machines. However, the operating temperature of the bearing is a primary factor in determining reliability of the bearing. The lower the operating temperature, the higher the resulting bearing reliability. In many rotating machines, one or more shaft bearings may be located deep inside the rotating machine where it is difficult to use ambient air to cool the bearing. For example, the cooling air may have already absorbed significant heat traversing the rotating machine by the time that it reaches the bearing. Even when air is forced into a rotating machine, the high-speed rotation of the air can have shearing effects on fluids in the rotating machine that adversely affect operation.

SUMMARY

A rotating machine includes a housing and a first bearing received in the housing. The rotating machine also includes a shaft supported by the first bearing. The shaft defines a central axis that extends in a longitudinal direction. The shaft also defines an outer diameter that is radially spaced from the central axis. The rotating machine also includes at least one duct radially interior to the outer diameter of the shaft. The at least one duct includes an inlet port and a radial outlet port that are in fluid communication with one another. The inlet port is configured to receive air and the radial outlet port is configured to discharge the air. The rotating machine also includes an air mover longitudinally disposed between the first bearing and the inlet port of the at least one duct. The air mover is configured to create an area of air pressure at the radial outlet port that is less than an air pressure at the inlet port.

DETAILED DESCRIPTION

Figure 1:
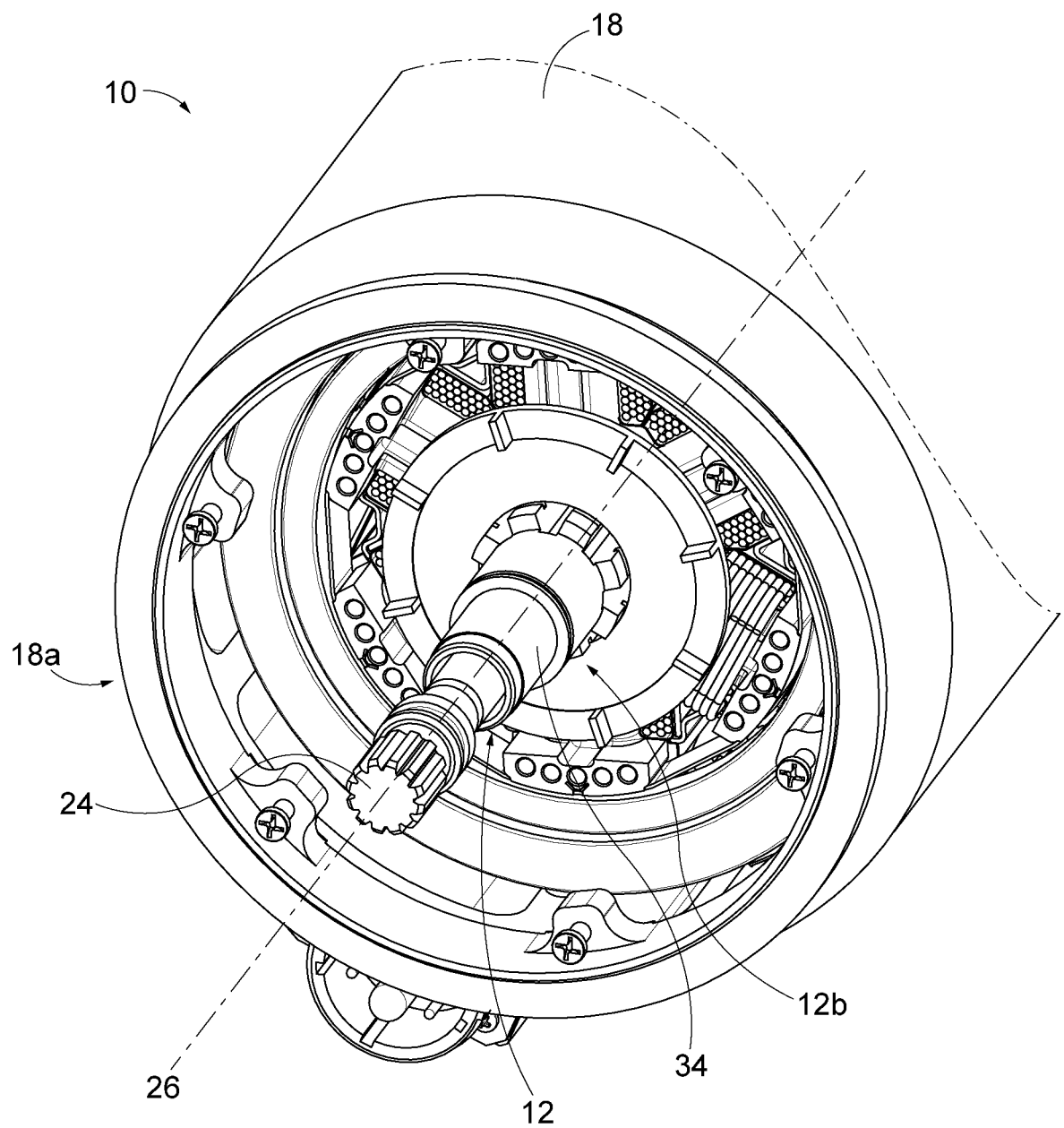
FIG. 1 is a perspective view of a rotating machine.

FIG. 1 is a perspective view of a rotating machine 10. The rotating machine 10 could be any number of devices, including for example, an electrical generator, a starter, a pump, or a compressor. The rotating machine 10 could be ultimately used in any number of devices, including for example an aircraft.

With reference to the figures, the rotating machine can include a shaft 12 that is rotationally supported by a first bearing 14, and optionally a second bearing 16 that are both received in a housing 18. The shaft 12 can also include at least one duct 20 that cooperates with an air mover 22 to move air through the shaft 12 to cool the first bearing 14. Further, the shaft 12 may receive a coupling member 24 to rotatably connect the rotating machine 10 to another device or machine (not shown).

Initially, it is noted that the housing 18 can have a cylindrical shape and defines a cavity 18a for receiving the various internal components of the rotating machine 10. However, it will be appreciated that the housing 18 could be any number of other shapes without departing from the scope of the disclosure. The housing 18 can be made of any number of materials of sufficient strength and durability to contain and provide protection to the internal components of the rotating machine 10 disposed therewithin.

The shaft 12 longitudinally extends along the rotating machine 10 and can have a generally circular cross-section. The shaft 12 can be made from any number of materials, including for example, steel, stainless steel, nickel super alloys, and aluminum. In one embodiment, the shaft 12 is a spider shaft and the rotating machine 10 is a six-pole field winding.

Further, the shaft 12 extends in a longitudinal direction to define a central axis 26. Notably, the central axis 26 longitudinally extends along the shaft 12 so as to pass through a radial center along an entire length of the shaft 12. Further still, the shaft 12 defines an outer diameter 34 that is radially spaced from the central axis 26. The central axis 26, which runs parallel to line 2-2 of FIG. 1, extends between an inboard end 12a and an outboard end 12b of the shaft 12. The inboard end 12a is distal to the coupling member 24, whereas the outboard end 12b is proximal to the coupling member 24. The housing 18 is fixed with relation to the shaft 12. As will be appreciated, without the duct 20 in cooperation with the air mover 22 (i.e., a traditional assembly), cooling the area near the outboard end 12b would be difficult, thereby resulting in increased bearing temperatures, and hence increased bearing failures.

The rotating machine 10 also includes the air mover 22, which can be a mechanical or electro-mechanical system, apparatus, or device operable to move air and/or other gases. The air mover 22 can have a disk-like shape and may be made from any number of materials which provide sufficient strength to allow for the air mover 22 to move the ambient air that in within the cavity 18a of the housing 18 through the duct 20 as will be described in more detail hereinafter.

As illustrated, the air mover 22 is separable from the shaft 12. However, it will be appreciated that the air mover 22 could be integral with the shaft 12 without departing from the scope of the disclosure. Rather, an aspect of the air mover 22 is its ability to move air through the air duct 20. The referenced air can be ambient air that is already within the cavity 18a of the housing 18 without any additional work by the The air mover 22 may comprise a fan, a rotating arrangement of vanes or blades which act on the air. In some embodiments, the air mover 22 may comprise a blower. In one embodiment, the air mover 22 is a centrifugal fan that employs rotating impellers to accelerate air through the at least one duct 20 as will be described in more detail hereinafter. In another embodiment, the air mover 22 may be a disk, such as, a shear pump. Notably, the air mover 22 creates a low-pressure zone near the outboard end 12b of the shaft 12 to draw ambient air through the at least one duct 20 in the shaft 12 to cool the first bearing 14 that supports the shaft 12.

Figure 2:
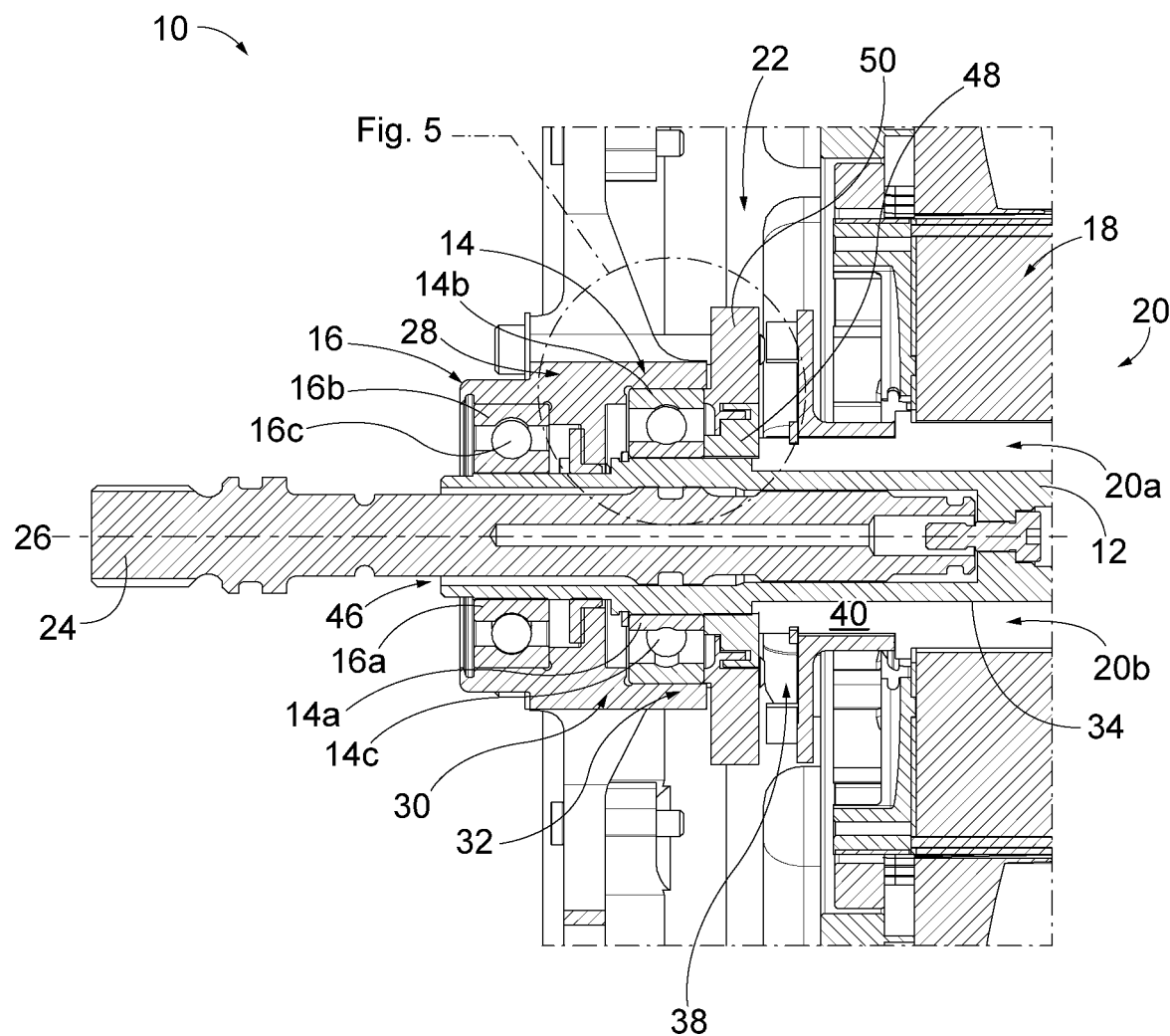
FIG. 2 is a partial sectional view, taken along line 2-2 of FIG. 1.

With reference to FIG. 2, the first bearing 14 and the second bearing 16 can rotationally support the shaft 12 so as to provide radial centerline control of the shaft 12. The first bearing 14 and the second bearing 16 may be open bearings that are running in a grease cavity 28 in the housing 18. In one embodiment, the grease cavity 28 is sealed with a close running seal 30 on the side toward the outboard end 12b and a labyrinth seal 32 on a side toward the inboard end 12a.

The second bearing 16 is longitudinally exterior to the first bearing 14. For example, the second bearing 16 may be longitudinally exterior to the first bearing 14 such that the first bearing 14 is longitudinally disposed between the second bearing 16 and the air mover 22. The housing 18 retains and supports the first bearing 14 and the second bearing 16.

The first bearing 14 and the second bearing 16 can be of the same or different type from one another. As illustrated, the first bearing 14 and the second bearing 16 could be rolling-element bearings. However, it will be appreciated that other types of bearings (e.g., needle bearing, jewel bearing, fluid bearing, magnetic bearing, etc.) are possible without departing from the scope of the disclosure. The bearings 14, 16 can include an inner race 14a, 16a, an outer race 14b, 16b, and the bearing elements 14c, 16c radially disposed therebetween.

As noted hereinbefore, the failure of a bearing can be caused by high operating temperature. Accordingly, the present disclosure addresses this issue by providing air to the first bearing 14 to cool the bearing 14, and hence improve its operational life. In particular, the ambient air is provided to the first bearing 14 through the at least one duct 20. The at least one duct 20 is radially interior to the outer diameter 34 of the shaft 12. For example, the at least one duct 20 may be formed by grooves in the shaft 12. In another embodiment, the duct 20 may include one or more holes or bores in the shaft 12. The duct 20 may be comprised of a complicated arrangement of one or more tunnels through the shaft 12. The shape of the duct 20 may be based on the structure of the shaft 12.

As shown in FIG. 2, the at least one duct 20 can include a first duct 20a and a second duct 20b to provide air to the first bearing 14 and optionally, a plurality of bearings. The first duct 20a and the second duct 20b can be radially separated by the central axis 26 of the shaft 12. It is noted that the first duct 20a and the second duct 20b are not in direct fluid connection with one another. While two ducts 20a, 20b are shown, more or fewer ducts may be used without departing from the scope of the disclosure. Further, the number of ducts 20 can based on the number or location of bearing.

Next, a description regarding the first and second ducts 20a, 20b will be presented. It is noted that the following discussion refers generally to either the first duct 20a or the second duct 20b. For clarity, each component (i.e., 36, 38, 40, 42, 44) of the respective duct 20a, 20b shares the same reference number with either an appended "a" or "b" designating that it is a part of either the first duct 20a or the second duct 20b, respectively. It will be appreciated that future references to the at least one duct 20 are considered applicable to either the first duct 20a, the second duct 20b, or both the first duct 20a and the second duct 20b.

The first and second ducts 20a, 20b each have a first end that is an inlet port 36a, 36b and a second end that is a radial outlet port 38a, 38b. As is considered apparent, the ports 36a, 36b, 38a, 38b are all defined by the shaft 12, and more specifically the outer diameter 34 of the shaft 12. The inlet port 36a, 36b receives ambient air from within cavity 18b of the housing 18 and the radial outlet port 38a, 38b discharges the ambient air from the inlet port 36a, 36b.

The inlet port 36a, 36b defines an inlet port size and the radial outlet port 38a, 38b defines a radial outlet port size. The inlet port size and the radial outlet port size may be based on creating a low pressure area at the radial outlet port 38a, 38b such that ambient air is drawn through the first and second ducts 20a, 20b from the inlet port 36a, 36b toward the radial outlet port 38a, 38b. For example, the inlet port size can be greater than the radial outlet port size to encourage air flow through the duct 20a, 20b.

The inlet port 36a, 36b can be located toward the inboard end 12a of the shaft 12. The radial outlet port 38a, 38b can be spaced away from the inlet port 36a, 36b so as to be toward the outboard end 12b of the shaft 12 and adjacent the first bearing 14. Further, the inlet port 36a, 36b and the radial outlet port 38a, 38b may be radially spaced from the central axis 26. The inlet port 36a, 36b and the radial outlet port 38a, 38b can be oriented so as to open in a same radially outward direction.

The inlet port 36a, 36b and the radial outlet port 38a, 38b are in fluid communication with one another through a passageway 40a, 40b, respectively. As is considered apparent, the inlet port 36a of the first duct 20a is not in fluid communication with the inlet port 36b of the second duct 20b. Nor is the radial outlet port 38a of the first duct 20a in fluid communication with the radial outlet port 38b of the second duct 20b. Finally, the radial outlet port 38a is not in fluid communication with the radial outlet port 38b. This preceding discussion relating to fluid communication is understood to be prohibiting direct fluid communication. However, it is understood that the ports 36a, 36b, 38a, 38b could potentially be considered to be in indirect fluid communication with one another due to all of the ports 36a, 36b, 38a, 38b being in the cavity 18b of the housing 18. Nevertheless, it is understood that the term direct fluid communication as it relates to the ports 36a, 36b, 38a, 38b is directed to communication in which the ports 36a, 36b, 38a, 38b would share a common path other than the cavity 18b.

The passageway 40a, 40b can be interior to the outer diameter 34 of the shaft 12. The passageway 40a, 40b may primarily extend in the longitudinal direction and be generally aligned with the central axis 28. Alternatively, the shape of the passageway 40a, 40b may be angled through the shaft 12, As noted hereinbefore, the duct 20a, 20b can include the inlet portion 42a, 42b and the outlet portion 44a, 44b. The inlet portion 42a, 42b and the outlet portion 44a, 44b can extend radially outward from the passageway 40a, 40b Accordingly, the passageway 40a, 40b may be generally orthogonal to the inlet portion 42a, 42b and the outlet portion 44a, 44b, and the inlet portion 42a, 42b and the outlet portion 44a, 44b can be generally parallel to one another.

The inlet portion 42a, 42b fluidly connects the inlet port 36a, 36b to the passageway 40a, 40b and the outlet portion 44a, 44b fluidly connects the radial outlet port 38a, 38b to the passageway 40a, 40b. Thus, the first duct 20a includes the inlet port 36a, the inlet portion 42a, the passageway 40a, the outlet portion 44a, and the radial outlet port 38a and the second duct 20b includes the inlet port 36b, the inlet portion 42b, the passageway 40b, the outlet portion 44b, and the radial outlet port 38b.

The shaft 12 may also include a blind bore 46 that extends in the longitudinal direction from the outboard end 12b toward the inboard end 12a so as to be generally parallel to the passageway 40a, 40b. The blind bore 46 is not in direct fluid communication with the passageway 40a, 40b. Further, the blind bore 46 is not in direct fluid communication with the duct 20a, 20b. The blind bore 46 may extend along the central axis 26 of the shaft 12. The blind bore 46 is configured to receive the coupling member 24.

With reference to the figures, the air mover 22 moves the ambient air through the ducts 20a, 20b from the inlet port 36a, 36b to the radial outlet port 38a, 38b. The air mover 22 is longitudinally disposed between the first bearing 14 and the inlet port 36a, 36b of the duct 20a, 20b. The air mover 22 may be coupled to the housing 18 and/or formed as an integral part of the housing 18. In one embodiment, the air mover 22 may be placed around the coupling member 24 for connection to another rotating device.

As discussed above, the air mover 22 moves the air to create an area of air pressure at the radial outlet port 38a, 38b that is less than an air pressure at the inlet port 36a, 36b. To do this, the air mover 22 can include a rotating fin 48 and a stationary fin 50. The stationary fin 50 is radially spaced from the central axis 26. The rotating fin 48 rotates about the central axis 26 drawing ambient air through the duct 20a, 20b toward the stationary fin 50 and the first bearing 14. The air mover 22 has stationary fins 50 arranged around the shaft 12. The stationary fins 50 may include holes or bores configured to radiate heat away from the internal components of the rotating machine 10, specifically, any buried bearings including the first bearing 14 or second bearing 16. Accordingly, the air mover 22 and the at least one duct 20 are configured to move ambient air through the shaft, thereby cooling the components of rotating machine 10.

The radial outlet port 38a, 38b of the duct 20a, 20b can be adjacent the rotating fin 48 of the air mover 22. The rotation of the rotating fin 48 pulls air out of the duct 20a, 20b creating a low pressure area at the radial outlet port 38a, 38b such that ambient air is drawn through the duct 20a, 20b from the inlet port 36a, 36b toward the radial outlet port 38a, 38b. The temperature differential has a cooling effect on the rotating machine 10 and more specifically to the parts of the rotating machine 10 adjacent to the duct 20a, 20b. In particular, by routing the air that travels through the duct 20a, 20b to the buried first bearing 14, the ambient air wicks heat away from the first bearing 14 based on the temperature differential. This increases the operating life of the first bearing 14.

The rotating fin 48 can be fixably attached to the shaft 12 and the stationary fin 50 can be fixably connected to the housing 18. The rotating fin 48 of the air mover 22 can be adjacent the radial outlet port 38a, 38b of the duct 20a, 20b. The rotating fin 48 may be a fan, such as a centrifugal fan, or a disk, such as, a shear pump, or a portion of the fan or disk. For example, the rotating fin 48 may be a blade of a centrifugal fan.

The duct 20a, 20b terminates near the air mover 22. In particular, the passageway 40a, 40b may extend primarily in a longitudinal direction and terminate near the rotating fin 48 and the outlet portion 44a, 44b may radially extend along the rotating fin 48. As discussed above, the rotating fin 48 creates a low-pressure zone adjacent the first bearing 14 to generate ambient air flow that wicks heat away from the first bearing 14. The heat wicking is further facilitated by the stationary fin 50 that radially extends outward. For example, the stationary fin 50 may be in contact with the inner race 26a of the first bearing 14 and wick heat from the first bearing 14 through conduction. Accordingly, the at least one duct 20 and the air mover 22 cool the first bearing 14.

Figure 3:
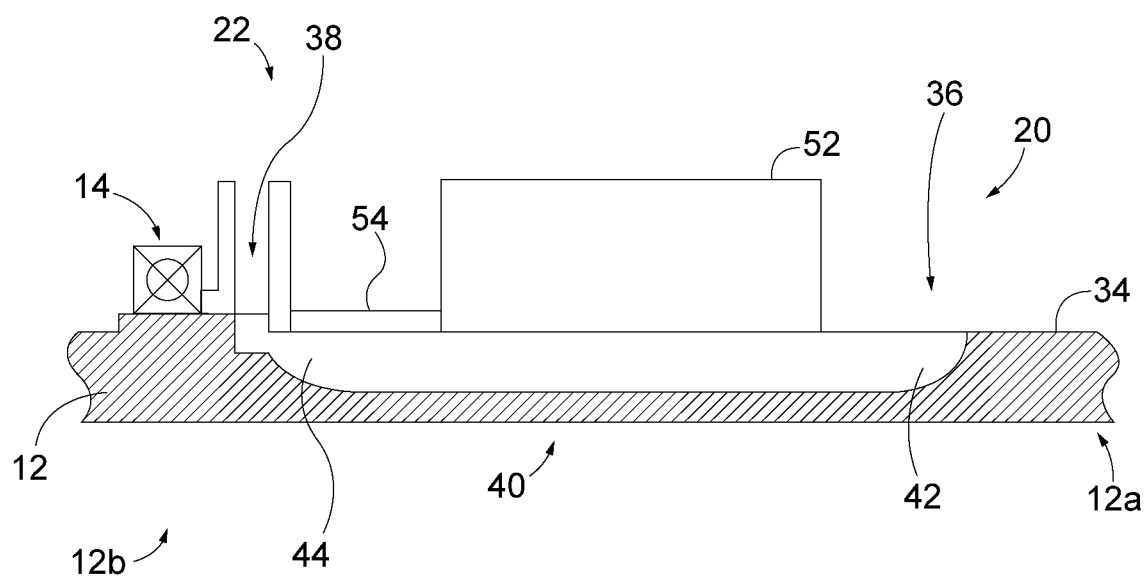
FIG. 3 is a schematic section view of a shaft.

FIG. 3 is a schematic sectional view of the shaft 12 in the rotating machine 10. In addition to the shaft 12, the first bearing 14, and the at least one duct 20 described above, the rotating machine 10 can include a rotating element 52 and a sleeve 54. The rotating element 52 can be fixably attached to the shaft 12 and may be a rotor that rotates with the shaft 12.

The at least one duct 20 can be at least partially radially disposed between the rotating element 52 and the central axis 26 of the shaft 12. For example, the air mover 22 may be longitudinally disposed between the first bearing 14 and the rotating element 52. In the example in which the rotating element 52 is a rotor and the air mover 22 has a rotating fin 48 that is a centrifugal fan, or a portion thereof, the rotor and the centrifugal fan are fixably attached to the shaft 12. The centrifugal fan can be longitudinally disposed between the first bearing 14 and the rotor 52.

The sleeve 54 can coaxially receive at least a part of the shaft 12. Further, the sleeve 54 can be disposed such that the air mover 22 is longitudinally located between the sleeve and the first bearing 14. The sleeve 54 can cover portions of the at least one duct 20 not radially enclosed by the shaft 12 between the inlet port 36a, 36b and the radial outlet port 38a, 38b. The sleeve 54 can cover any open area of shaft 12 to prevent air from leaking into or out of the at least one duct 20.

The sleeve 54 may be flexible or rigid material. For example, the sleeve 54 may be tape, mesh, etc. used to cover the open area. The sleeve 54 can be formed from a variety of materials, such as composites, metal, foil, rubber, plastic, glass, ceramic, adhesive, etc. Further, the sleeve 54 may be made from a similar material as the shaft 12. Ensuring that the duct 20 is sealed except for at the ports 36a, 36b, 38a, 38b allows the low pressure zone near the air mover 22 to be possible, thereby guaranteeing the flow of air through the at least one duct 20. As will be appreciated, leaks may reduce the velocity of the flow or completely stop the flow of air through the duct 20.

The sleeve 54 may encircle at least a portion of the shaft 12 to extend along the longitudinal length of the shaft 12. The sleeve 54 may be wound around an open area of the shaft 12 that is not otherwise enclosing the duct 20. The sleeve 54 can be a substantially cylindrical shell, which can be one or multiple pieces. The sleeve 54 can be retained in various ways, including, for example, recesses in the sleeve 54 or by mechanical fasteners such as screws, pins, rivets, snap rings, bands, and buckles. The sleeve 54 can also be disposed outside and/or around the shaft 12 or fitted inside the shaft 12.

Figure 4:
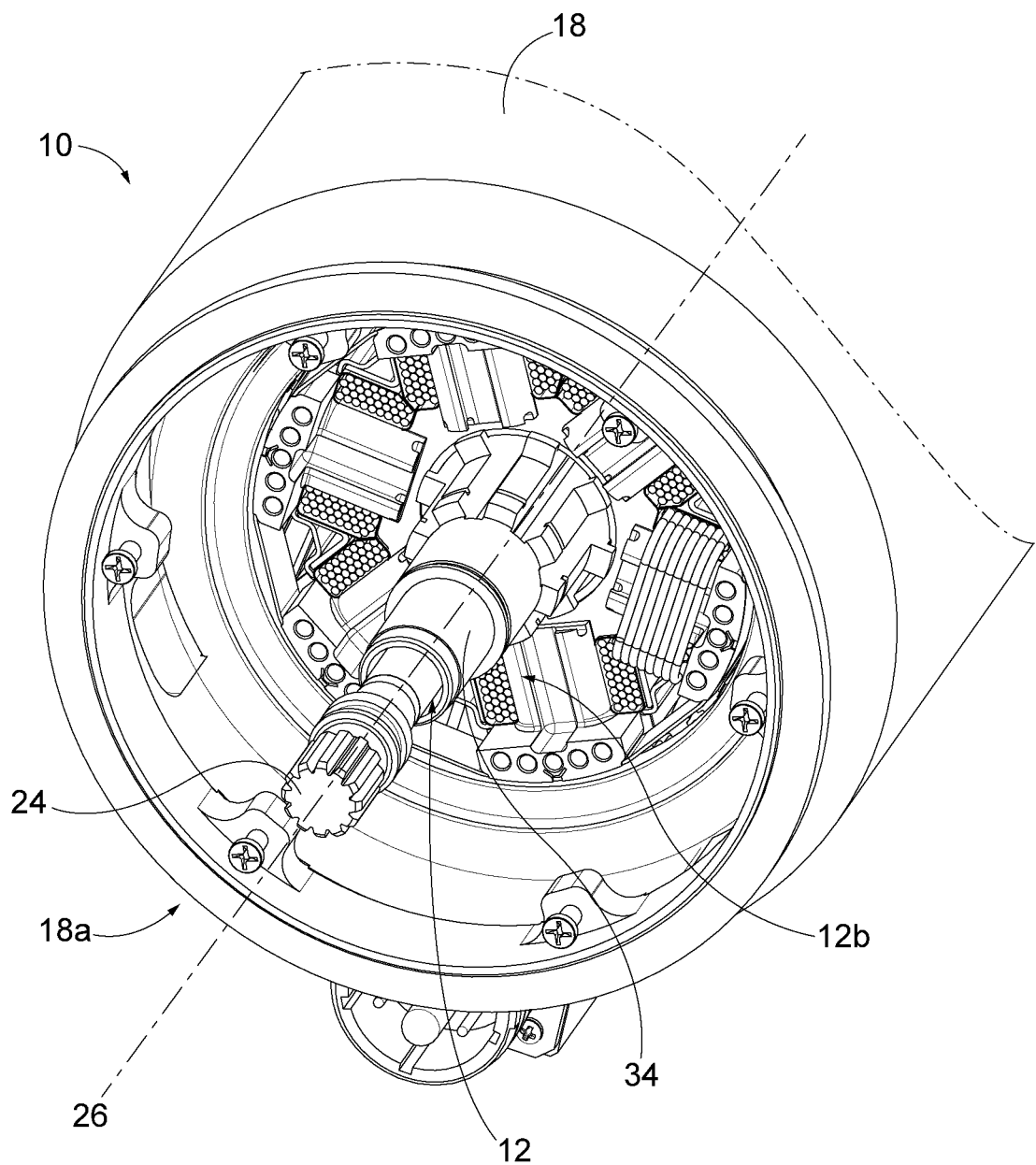
FIG. 4 is a perspective view of the rotating machine.
Figure 5:
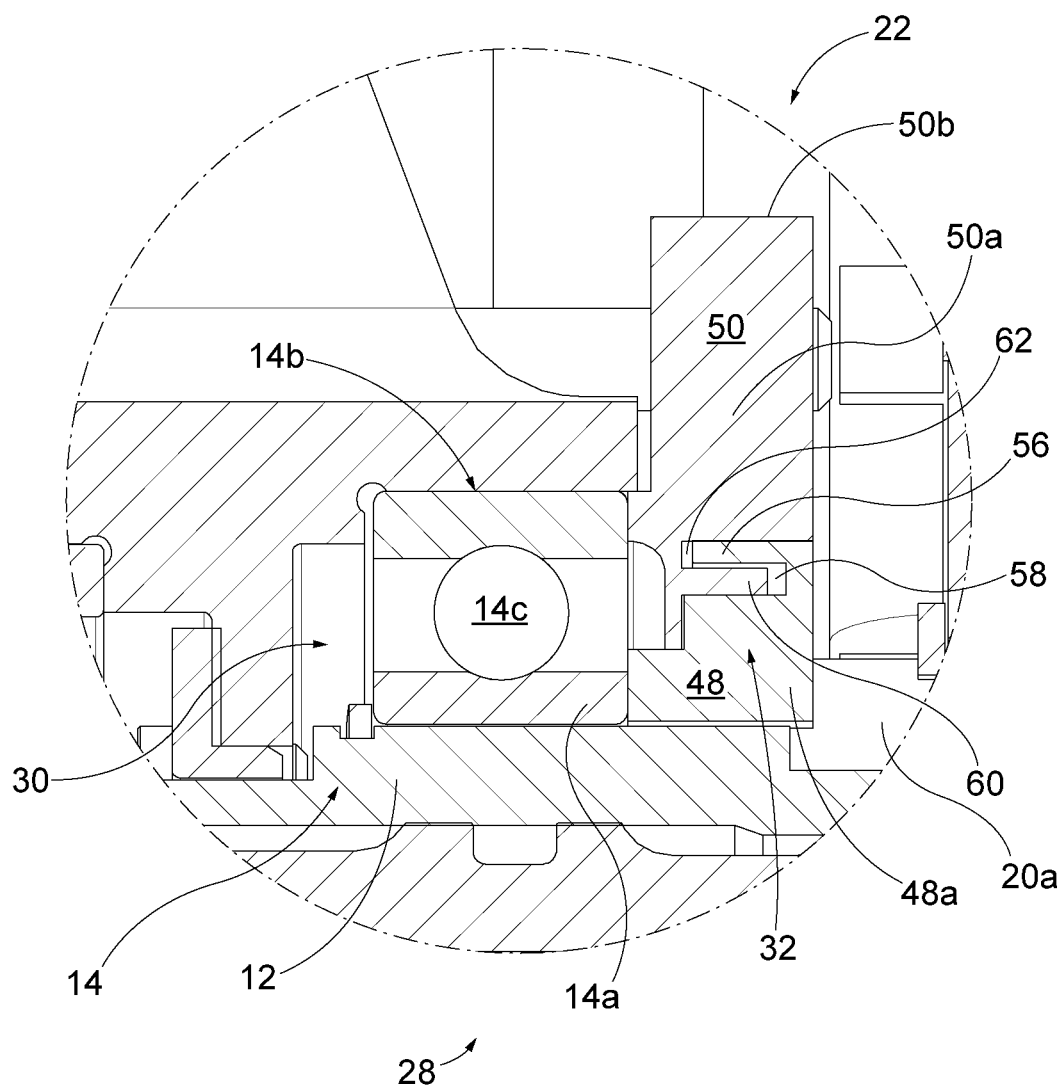
FIG. 5 is an enlarged schematic view of a grease cavity.

FIG. 4 is perspective view of the rotating machine 10. The example shown, the air mover 22 is arranged around the shaft 12, which may be a spider shaft. FIG. 5 is a partial enlarged schematic view of the grease cavity 28 that is partially formed by the air mover 22. As noted hereinbefore, the air mover 22 can include the rotating fin 48 and the stationary fin 50 that are adjacent one another. The labyrinth seal 32 of the grease cavity 28 is formed by a cooperation between a portion of the rotating fin 48 and a portion of the stationary fin 50 such that the rotating fin 48 and the stationary fin 50 form a barrier as will be described in more detail hereinafter. In particular, the rotating fin 48 includes a hub portion 48a that defines an inner diameter of the fin 48 that coaxially receives the shaft 12. The rotating fin 48 can also include a rib 56 that cooperates with the hub portion 48a to define a trough 58 of the rotating fin 48.

The stationary fin 50 can include a main body portion 50a and can define a fin outer diameter 50b that is radially exterior to the inner diameter of the rotating fin 48. Further, the main body portion 50a and a finger 60 of the stationary fin 50 can cooperate to define a channel 62 of the stationary fin 50. The trough 58 of the stationary fin 50 can receive the finger 60 of the stationary fin 50 and the rib 56 of the rotating fin 48 can be received by the channel 62 of the stationary fin 50. Thus, the labyrinth seal 32 is formed by the interaction between the trough 58 and the finger 60 and the interaction between the rib 56 and the channel 62. As such, the rotating fin 48 and the stationary fin 50 can cooperate to form the labyrinth seal 32 such that the rotating fin 48 is radially interior to the stationary fin 50.

In this manner, the rotating fin 48 and the stationary fin 50 form a portion of the grease cavity 28. The stationary fin 50 can also prevent longitudinal movement of the first bearing 14 toward the rotating element 52. Accordingly, the rotating fin 48 and stationary fin 50 are longitudinally positioned between the grease cavity 28 and the at least one duct 20.

The apparatus described in this disclosure is a notable improvement over the conventional arrangements listed above due to its simplicity and robustness. No complex assemblies, electronics or programming logic is required to safely cool a buried bearing and reduce bearing failure. This results in lower manufacturing costs and lower weight. As this system results in a substantially lower weight, as compared to other systems, the operating cost for any aircraft that includes this system is lower.

A rotating machine has been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that various of the above-disclosed and other features and functions, or alternatives or varieties thereof, may be desirably combined into many other different systems or applications, also that various presently unforeseen or unanticipated alternatives, modifications, variations, or improvements, therein may be subsequently made by those skilled in the art which are also intended to be encompassed by the following claims.

The invention claimed is:

1. A rotating machine, comprising:
a housing;
a first bearing received in the housing;
a shaft supported by the first bearing, the shaft defining a central axis that extends in a longitudinal direction, wherein the shaft defines an outer diameter that is radially spaced from the central axis;
at least one duct radially interior to the outer diameter of the shaft, the at least one duct including an inlet port and a radial outlet port that are in fluid communication with one another, wherein the inlet port is configured to receive air and the radial outlet port is configured to discharge the air; and
an air mover longitudinally disposed between the first bearing and the inlet port of the at least one duct, wherein the at least one duct includes a first duct and a second duct that are radially separated by the central axis of the shaft, and wherein the first duct and the second duct define fluidically different flow paths.

2. A rotating machine, comprising:
a housing;
a first bearing received in the housing;
a shaft supported by the first bearing, the shaft defining a central axis that extends in a longitudinal direction, wherein the shaft defines an outer diameter that is radially spaced from the central axis;
at least one duct radially interior to the outer diameter of the shaft, the at least one duct including an inlet port and a radial outlet port that are in fluid communication with one another, wherein the inlet port is configured to receive air and the radial outlet port is configured to discharge the air; and
an air mover longitudinally disposed between the first bearing and the inlet port of the at least one duct, wherein the air mover includes a stationary fin fixably connected to the housing and a rotating fin fixably attached to the shaft, the stationary fin defining a channel and a finger, wherein the rotating fin defines a trough that receives the finger of the stationary fin, wherein the rotating fin includes a rib that is received in the channel of the stationary fin such that the rotating fin is radially interior to the stationary fin.

3. The rotating machine of claim 2, wherein the stationary fin is configured to wick heat from the first bearing through conduction.

4. The rotating machine of claim 3, further comprising a rotating element fixably attached to the shaft, wherein the stationary fin prevents longitudinal movement of the first bearing toward the rotating element.

5. The rotating machine of claim 2, wherein the rotating fin rotates about the central axis.

6. The rotating machine of claim 5, wherein the radial outlet port of the at least one duct is adjacent the rotating fin of the air mover.

7. The rotating machine of claim 5, wherein the rotating fin is a shear pump.

8. The rotating machine of claim 2, further comprising a rotating element fixably attached to the shaft, wherein the at least one duct is at least partially radially disposed between the rotating element and the central axis of the shaft.

9. The rotating machine of claim 2, wherein the at least one duct includes a first duct and a second duct that are radially separated by the central axis of the shaft.

10. The rotating machine of claim 9, wherein the first duct and the second duct define fluidically different flow paths.

11. The rotating machine of claim 2, further comprising a sleeve that coaxially receives at least part of the shaft, wherein the sleeve is disposed such that the air mover is longitudinally located between the sleeve and the first bearing.

12. The rotating machine of claim 2, wherein the inlet port defines an inlet port size and the radial outlet port defines a radial outlet port size, and wherein the inlet port size is greater than the radial outlet port size.

13. The rotating machine of claim 2, further comprising a rotating element fixably attached to the shaft, wherein the rotating element is longitudinally disposed between the inlet port and the radial outlet port.

14. The rotating machine of claim 2, wherein the inlet port and the radial outlet port are oriented so as to open in a same radially outward direction.

15. The rotating machine of claim 2, wherein the at least one duct includes a passageway that extends within the shaft in primarily the longitudinal direction, an inlet portion that extends radially outward from the passageway so as to fluidly connect the inlet port to the passageway, and an outlet portion that extends radially outward from the passageway to fluidly connect the radial outlet port to the passageway.

16. The rotating machine of claim 15, wherein the passageway is orthogonal to the inlet portion and the outlet portion, and wherein the inlet portion and the outlet portion are parallel to one another.

17. The rotating machine of claim 15, wherein the shaft defines a blind bore that extends in the longitudinal direction so as to be parallel to the passageway, and wherein the blind bore is not in direct fluid communication with the passageway.

18. The rotating machine of claim 2, further comprising a rotor that is fixably attached to the shaft.

19. The rotating machine of claim 18, wherein the radial outlet port of the at least one duct is longitudinally disposed between the centrifugal fan and the rotor.

20. The rotating machine of claim 2, further comprising a second bearing longitudinally exterior to the first bearing such that the first bearing is longitudinally disposed between the second bearing and the radial outlet port of the at least one duct.

\* \* \* \* \*